United States Patent

Asahina

[15] 3,691,264
[45] Sept. 12, 1972

[54] PROCESS FOR PRODUCING STABLE ELECTRET CONSISTING OF A CRYSTALLINE HIGH MOLECULAR WEIGHT MATERIAL

[72] Inventor: Mitsuo Asahina, Tokyo, Japan
[73] Assignee: Kureha Kagoku Kogko Kabushiki Kaisha, Tokyo, Japan
[22] Filed: July 16, 1970
[21] Appl. No.: 55,548

[30] Foreign Application Priority Data

July 17, 1969 Japan ..................44/56614

[52] U.S. Cl. ..............264/22, 264/108, 264/216, 264/DIG. 45
[51] Int. Cl. ..............................B29c 25/00
[58] Field of Search...264/27, 108, 22, 24, 216, DIG. 45

[56] References Cited

UNITED STATES PATENTS 3,398,216  8/1969  Petry..................264/108

OTHER PUBLICATIONS

Gross, B.; Charge Storage in Solid Dielectrics, Elsevier Publ. Co., New York, N.Y., 1964, QC 585 G76. Pages 14, 10.
Chemical Abstracts, 65, 1966, p. 17071a; Persistant Polarization in Polymers I., by M. L. Miller Primary Examiner—Robert F. White
Assistant Examiner—Gene Auville
Attorney—Sughrue, Rothwell, Mion, Zinn and Macpeak

[57] ABSTRACT

A process for producing a crystalline high molecular weight material electret which comprises melting and molding a crystalline high molecular weight material, quenching said high molecular weight material to a temperature lower than the crystal dispersion temperature of the high molecular weight material and then applying a direct current field to the quenched material at temperatures between the crystal dispersion temperature and the melting point of the material is disclosed.

1 Claim, 2 Drawing Figures

PVF/PMMA VISCOELASTIC SPECTRUM

PVF/PMMA VISCOELASTIC SPECTRUM

THE SURFACE POTENTIAL OF THE ELECTRET

PROCESS FOR PRODUCING STABLE ELECTRET CONSISTING OF A CRYSTALLINE HIGH MOLECULAR WEIGHT MATERIAL

BACKGROUND OF THE INVENTION

1. Field of the Invention

The present invention relates to a process for producing a stable electret having excellent properties.

2. Description of the Prior Art

An electret which can remain in its polarized state for a long period of time is generally made of an organic material, such as carnauba wax, or a high molecular weight dielectric material such as a fluorocarbon resin. These have been widely used as transducers and other electronic materials.

A particularly desirable electret is required to have a high surface charge density and less charge decay for a long period of time. According to the general process conventionally employed, an electret is prepared by applying heat energy to a dielectric material in an appropriate direct current field, whereby an internal ion or a dipole is maintained for a definite period of time in a state free from freezing, and stopping the supply of heat energy by cooling or other suitable means in that state.

As materials for electrets, there have hitherto been employed carnauba wax or a mixture thereof, a low molecular weight material such as sulfur, a non-crystalline high molecular weight material such as polymethyl methacrylate, and the like, and a crystalline high molecular weight material such as polyethylene terephthalate, polypropylene, Teflon, polyvinylidene fluoride, polyvinyl fluoride, and the like. Among these the crystalline high molecular weight materials have desirable characteristics as the material for electrets in comparison with other materials in facilitating working or fabrication and in mechanical strength.

To provide to the crystalline high molecular weight material the properties of an electret, a method has been conducted generally in which the un-stretched or stretched material, which has already been fabricated into the shape of the product, is subjected to a direct current high intensity electric field at an appropriate temperature range between the second transition point of the material and the melting point thereof.

SUMMARY OF THE INVENTION

The present invention provides a process for producing an electret which comprises quenching a crystalline high molecular weight material after melting and molding it, whereby the material is fixed in a non-crystalline state or a crystalline state having a high defect level, and then treating the material in a high intensity direct current field in a conventional manner.

DETAILED DESCRIPTION OF THE INVENTION

In other words, when a crystalline high molecular weight material which has been brought into a non-crystalline state or into a near non-crystalline state is crystallized at temperatures lower than the melting point of the crystalline high molecular material itself and higher than the glass transition point, a high intensity direct current electric field is applied to the material under crystallization, whereby crystallization and polarization of the material are conducted simultaneously.

The quenching can be conducted by a conventional manner, such as with air cooling, water cooling, methanol-dry ice cooling, and the like. Since the purpose of quenching is the bringing of the crystalline material to a non-crystalline state or a state near the non-crystalline state, it is necessary to avoid exposing the material to temperatures advantageous for the growth of the crystal nucleus of the polymer for a long period of time. The upper limit of the quenching temperature is the so-called alpha dispersion temperature. The alpha dispersion temperature is shown by a dispersion temperature on the high temperature side in the visoelasticity temperature distribution spectra. The alpha dispersion temperature of a highly crystalline high molecular weight material, such as polyvinylidene fluoride or polypropylene, is the crystalline dispersion temperature and it is known that the rate of crystallization of such a material is low at temperatures lower than the crystal dispersion temperature. Also, in a high molecular material which does not show clearly the crystal dispersion, the dispersion in the segment motion of the main chain in an amorphous region appears as the alpha dispersion and in this case, at temperatures lower than the alpha dispersion temperature, molecular motion in the amorphous region is inactive and, hence, crystallization does not really occur.

Thus, in any case, the rate of crystallization is reduced at temperatures lower than the alpha dispersion temperature and hence the material can be cooled to temperatures lower than the alpha dispersion temperature. Also, it is desirable that the formation of the electret from the high molecular weight compound be conducted at temperatures lower than the alpha dispersion temperature and readily causing crystallization.

The crystal dispersion temperature of a mainly high molecular weight material used in the production of electrets is, for example, about 80° C. in polyethylene, about 80° C. in polyvinylidene chloride, about 80° C. in an alpha-type polyvinylidene fluoride, and about 100°–120° C. in a beta-type polyvinylidene fluoride.

EXAMPLE 1

Figure 1:
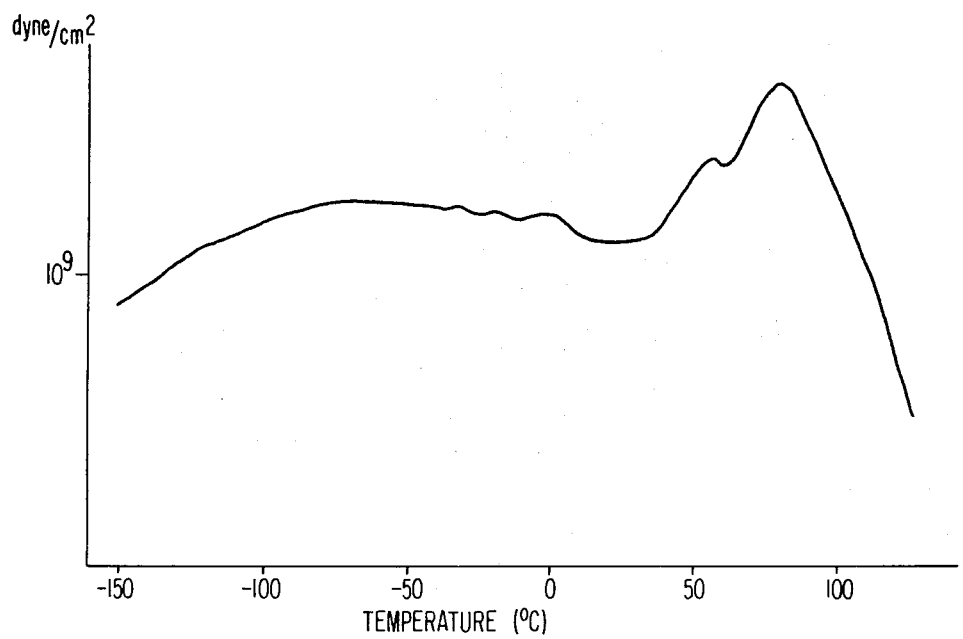
FIG. 1 is a graph showing the viscoelastic spectrum of one embodiment of this invention in which a polyvinylidine fluoride/polymethyl methacrylate (PVF/PMMA) polymer is used.

A molten mixture of polyvinylidene fluoride and polymethyl methacrylate in a ratio of 70/30 has the viscoelastic spectrum shown in FIG. 1 of the attached drawings and the crystalline dispersion temperature thereof was 80° C.

By cooling the molten mixture with water, the mixture was brought to about 40° C. immediately after extruding the mixture. A molding in a T-die sheet shape having a near non-crystalline state was obtained. To both surfaces of the T-die extruded sheet having a thickness of 1 mm and in a non-crystalline state were disposed electrodes and a direct current potential of 50 kv/cm was applied to the electrodes. The sheet was heated to 150° C. in an air bath in this state and then allowed to cool to room temperature while applying the electric potential. The electret A was thus obtained.

On the other hand, a sheet was prepared by allowing the molten mixture, as used in preparing electret A, to cool without quenching it. This sheet had a degree of crystallinity of about 50 percent and the sheet was subjected to the same procedure for producing an electret as in producing electret A. The electret thus prepared is called electret B.

Figure 2:
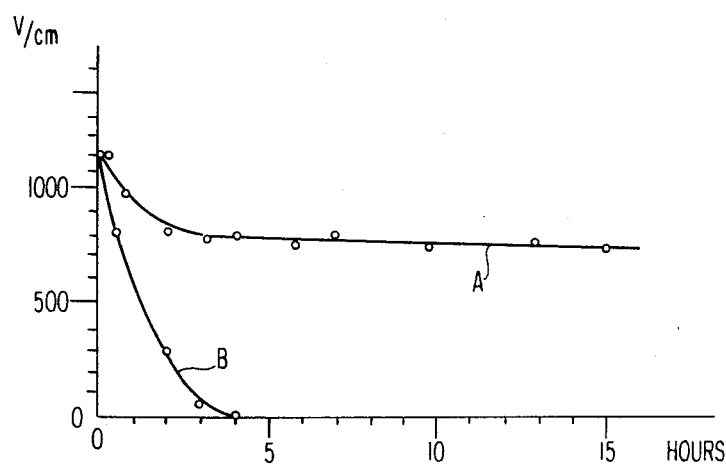
FIG. 2 is a graph showing the surface potential decay profile of an electret (A), prepared according to the process of this invention, and a conventionally prepared electret (B).

Both electrets were stored in an air bath at 80° C. and then the decay of the surface charge with the passage of time of the two electrets was measured. The results demonstrated that electret A prepared by the process of this invention showed markedly excellent stability or durability in comparison with electret B, prepared by conventional processing as shown in FIG. 2 of the accompanying drawings.

EXAMPLE 2

A sheet of non-crystalline polyethylene terephthalate of 1 mm in thickness was prepared by quenching the sheet after melting and molding the polyethylene terephthalate and was heated to 160° C. for 1 hour while a direct current potential of 50 kv was applied to provide an electret. The surface potential of the electret thus obtained was 1,000 volts at a distance of 1 cm. from the surface and no decay of the potential was observed even after 3 months.

On the other hand, an electret prepared from a crystalline polyethylene terephthalate by the same procedure as used above had the same surface potential as above but the surface potential of it was reduced to 600 volts after 3 months from the production thereof.

What is claimed is:

1. A process for producing a crystalline high molecular weight material electret which comprises melting and molding a crystalline high molecular weight material, quenching said high molecular weight material to a temperature lower than the crystal dispersion temperature of the high molecular weight material, whereby the material is fixed in a non-crystalline state or a near non-crystalline state, and then treating the material in a direct current field at temperatures between the crystal dispersion temperature and the melting point of the material.

* * * * *